United States Patent
Yan

(10) Patent No.: US 10,612,927 B2
(45) Date of Patent: Apr. 7, 2020

(54) METHOD AND DEVICE FOR TESTING MOVEMENT SPEED

(71) Applicant: Goertek Inc., Weifang (CN)

(72) Inventor: Wenming Yan, Weifang (CN)

(73) Assignee: Goertek Inc., Weifang (CN)

( * ) Notice: Subject to any disclaimer, the term of this patent is extended or adjusted under 35 U.S.C. 154(b) by 387 days.

(21) Appl. No.: 15/517,475

(22) PCT Filed: Jun. 29, 2015

(86) PCT No.: PCT/CN2015/082670
§ 371 (c)(1),
(2) Date: Apr. 6, 2017

(87) PCT Pub. No.: WO2016/090898
PCT Pub. Date: Jun. 16, 2016

(65) Prior Publication Data
US 2017/0307377 A1 Oct. 26, 2017

(30) Foreign Application Priority Data
Dec. 12, 2014 (CN) .......................... 2014 1 0766835

(51) Int. Cl.
*G01C 21/16* (2006.01)
*G01P 5/14* (2006.01)
(Continued)

(52) U.S. Cl.
CPC ............ *G01C 21/16* (2013.01); *G01C 21/005* (2013.01); *G01P 5/14* (2013.01); *G01P 13/045* (2013.01);
(Continued)

(58) Field of Classification Search
CPC ....... G01C 21/005; G01P 5/14; G01P 13/045; G01S 19/49
(Continued)

(56) References Cited

U.S. PATENT DOCUMENTS 4,747,305 A * 5/1988 Evans ..................... G01P 13/02
73/170.02
5,315,868 A 5/1994 Jacobi et al.
(Continued)

FOREIGN PATENT DOCUMENTS

CN 1260481 A 7/2000
CN 201307122 Y 9/2009
(Continued)

OTHER PUBLICATIONS

International Bureau of WIPO, International Search Report and Written Opinion in Application No. PCT/CN2015/082670, dated Oct. 13, 2015.
(Continued)

*Primary Examiner* — Thomas G Black
*Assistant Examiner* — Luat T Huynh
(74) *Attorney, Agent, or Firm* — LKGlobal | Lorenz & Kopf, LLP

(57) ABSTRACT

A method for testing movement speed includes, but is not limited to: measuring a static pressure $P_0$ of an inner cavity of a pressure hole of a mobile device (S100); aligning the pressure hole to a wind direction and measuring a total pressure P of the wind in a static state (S101); aligning the pressure hole to the wind direction in a moving process, and measuring a pressure $P_m$ of the inner cavity of the pressure hole in a movement direction (S102); obtaining a current wind speed $v_f$ according to a correspondence relationship between a wind speed $v_f$ and a dynamic pressure $P-P_0$; and obtaining a current relative movement speed $v_r$ according to a correspondence relationship between a relative movement speed $v_r$ and a pressure difference $P_m-P_0$ (S103); and obtaining a current movement speed v according to the current relative movement speed $v_r$ and the current wind speed $v_f$ (S104).

10 Claims, 2 Drawing Sheets

(51) Int. Cl.
   *G01C 21/00*   (2006.01)
   *G01P 13/04*   (2006.01)
   *G01P 15/08*   (2006.01)
   *G01S 19/49*   (2010.01)

(52) U.S. Cl.
   CPC .......... *G01P 15/0802* (2013.01); *G01S 19/49* (2013.01); *G01C 21/165* (2013.01)

(58) Field of Classification Search
   USPC .......................................................... 701/472
   See application file for complete search history.

(56) References Cited

U.S. PATENT DOCUMENTS

| | | | |
|---|---|---|---|
| 5,546,799 A * | 8/1996 | Parker ................ | G01P 3/487 702/148 |
| 8,800,361 B1 * | 8/2014 | Johnston ............. | G01W 1/06 73/170.16 |
| 2011/0201958 A1 * | 8/2011 | Lazar ................ | A61B 5/097 600/538 |
| 2012/0046792 A1 * | 2/2012 | Secor ............... | F24F 11/30 700/276 |
| 2016/0078061 A1 * | 3/2016 | Hilsdale ............ | G06F 16/21 707/687 |
| 2016/0223579 A1 * | 8/2016 | Froemel ............ | G01P 5/14 |

FOREIGN PATENT DOCUMENTS

| | | |
|---|---|---|
| CN | 102033137 A | 4/2011 |
| CN | 104155473 A | 11/2014 |
| CN | 104597273 A | 5/2015 |
| JP | 2005283495 A | 10/2005 |
| JP | 2009145265 A | 7/2009 |

OTHER PUBLICATIONS

Wu, Pan., "Practical Application of Pitot Tube in Well-Bore Wind Speed Measurement.", Science & Technology Information, dated Feb. 20, 2012, p. 529.

State Intellectual Property Office of the Peoples Republic of China, First Office Action of CN 201410766835.8, dated Jan. 11, 2017.

Wang, Xu et al., "Research and Development of Air Density Measuring Instrument", Physics Experimentation, dated Dec. 31, 2013, pp. 41-44.

\* cited by examiner

METHOD AND DEVICE FOR TESTING MOVEMENT SPEED

CROSS-REFERENCE TO RELATED APPLICATION

This application is a U.S. National-Stage entry under 35 U.S.C. § 371 based on International Application No. PCT/CN2015/082670, filed Jun. 29, 2015 which was published under PCT Article 21(2) and which claims priority to Chinese Application No. 201410766835.8, filed Dec. 12, 2014, which are all hereby incorporated in their entirety by reference.

TECHNICAL FIELD

This application pertains to the technical field of mobile terminals, and particularly to a method and device for testing movement speed.

BACKGROUND

The GPS is usually used in current mobile phones and wearable devices for navigation and positioning, and a movement speed is calculated according the positioning result. However, this method of testing the movement speed by virtue of the GPS is limited by GPS signal quality. If the GPS signal quality is poor, the measured movement speed exhibits a poor precision. Furthermore, the GPS signal is vulnerable to interference and unstable, and causes unreliable calculation results.

In addition, other objects, desirable features and characteristics will become apparent from the subsequent summary and detailed description, and the appended claims, taken in conjunction with the accompanying drawings and this background.

SUMMARY

The present disclosure provides a method and device for testing movement speed, to solve the problems in the prior art of the poor precision of the movement speed and unreliable calculation results when the GPS is used to test movement speed.

To achieve the above object, the present disclosure employs the following technical solutions:

In one aspect, the embodiments of the present disclosure provide a method for testing movement speed, the method comprising:

measuring a static pressure $P_0$ of an inner cavity of a pressure hole of a mobile device, wherein the pressure hole is in communication with the outside, and is a specifically formed opening or an existing designed opening in the mobile device;

aligning the pressure hole to a wind direction and measuring a total pressure P of the wind in a static state;

aligning the pressure hole to the wind direction in a moving process, and measuring a pressure $P_m$ of the inner cavity of the pressure hole in a movement direction;

obtaining a current wind speed $v_f$ according to a correspondence relationship between a wind speed $v_f$ and a dynamic pressure $P-P_0$, and obtaining a current relative movement speed $v_r$ according to a correspondence relationship between a relative movement speed $v_r$ and a pressure difference $P_m-P_0$; and obtaining a current movement speed v according to the current relative movement speed $v_r$ and the current wind speed $v_f$.

Preferably, the obtaining a current wind speed $v_f$ according to a correspondence relationship between a wind speed $v_f$ and a dynamic pressure $P-P_0$, and the obtaining a current relative movement speed $v_r$ according to a correspondence relationship between a relative movement speed $v_r$ and a pressure difference $P_m-P_0$ comprise: obtaining the current wind speed $v_f$ according to the formula $$v_f = \sqrt{\frac{2(P-P_0)}{\rho}},$$

and obtaining the current relative movement speed $v_r$ according to the formula $$v_r = \sqrt{\frac{2(P_m-P_0)}{\rho}},$$

wherein $\rho$ is air density.

Preferably, the method further comprises:

measuring a water vapor pressure e in air and measuring an air temperature T; and calculating the air density $\rho$ according to the formula $$\rho = \frac{P}{R_B T}(1 - 0.378 e/P),$$

wherein $R_B = 287.05$ J·kg$^{-1}$·K$^{-1}$ is a gas constant of dry air.

Preferably, the obtaining a current movement speed v according to the current relative movement speed $v_r$ and the current wind speed $v_f$ comprises:

calculating the current movement speed v according to the formula $v = v_r + v_f \cos\theta$, wherein $\theta$ is an angle of the deviating of the movement direction from the wind direction and in a range of [0°, 360°].

Preferably, the obtaining a current movement speed v according to the current relative movement speed $v_r$ and the current wind speed $v_f$ comprises: in upwind movement, calculating the current movement speed v according to the formula $v = v_r - v_f$; and in downwind movement, calculating the current movement speed v according to the formula $v = v_r + v_f$.

In another aspect, the embodiments of the present disclosure provide a device for testing movement speed, the device comprising:

a pressure sensor, disposed in an inner cavity of a pressure hole of the testing device; wherein the pressure hole is in communication with the outside, and is a specifically formed opening or an existing designed opening in the mobile device; the pressure sensor is configured to obtain a static pressure $P_0$ of the inner cavity of the pressure hole, and align the pressure hole to a wind direction and measure a total pressure P of the wind in a static state, and measure a pressure $P_m$ of the inner cavity of the pressure hole in a movement direction during movement;

a speed acquiring unit configured to obtain a current wind speed $v_f$ according to a correspondence relationship between a wind speed $v_f$ and a dynamic pressure $P-P_0$, and obtain a current relative movement speed $v_r$ according to a correspondence relationship between a relative movement speed $v_r$ and a pressure difference $P_m-P_0$; and a movement speed acquiring unit configured to obtain a current movement speed v according to the current relative movement speed $v_r$ and the current wind speed $v_f$.

Preferably, the speed acquiring unit comprises:

a wind speed acquiring module configured to obtain the current wind speed $v_f$ according to the formula $$v_f = \sqrt{\frac{2(P-P_0)}{\rho}};$$

and a relative speed acquiring module configured to obtain the current relative movement speed $v_r$ according to the formula $$v_r = \sqrt{\frac{2(P_m-P_0)}{\rho}},$$

wherein $\rho$ is air density.

Preferably, the device for testing movement speed further comprises:

a humidity sensor configured to measure a water vapor pressure e in air; a temperature sensor configured to measure an air temperature T; and an air density acquiring unit configured to calculate the air density $\rho$ according to the formula $$\rho = \frac{P}{R_B T}(1-0.378e/P),$$

wherein $R_B=287.05$ J·kg$^{-1}$·K$^{-1}$ is a gas constant of dry air.

Preferably, the movement speed acquiring unit is specifically configured to calculate the current movement speed v according to the formula $v=v_r+v_f\cos\theta$, wherein $\theta$ is an angle of the deviating of the movement direction from the wind direction and in a range of [0°, 360°].

Alternatively, the movement speed acquiring unit is specifically configured to, in upwind movement, calculate the current movement speed v according to the formula $v=v_r-v_f$; and in downwind movement, calculate the current movement speed v according to the formula $v=v_r+v_f$.

The advantageous effects of the embodiments of the present disclosure are as follows: the embodiments of the present disclosure provide a method and device for testing movement speed, wherein the pressure sensor is used to test the static pressure of the inner cavity of the pressure hole of the testing device and the total pressure in the static state, and the pressure in the inner cavity during movement; the wind speed and the relative movement speed are obtained individually according to the correspondence relationship of the speed and the pressure difference; and the movement speed is obtained by selecting corresponding relation formulas according to upwind and downwind situations. The present technical solution can effectively improve the testing precision of movement speed, there are no influence from external factors during testing, the testing results is accurate and reliable, and the technical solution is completely different from the solution of using the GPS to test movement speed in the prior art.

In a preferred embodiment, the temperature sensor and the humidity sensor are respectively used to measure the air temperature and the humidity, and the air density in any environment is calculated according to the air temperature and the humidity to replace the air density constant at the normal temperature and under the normal pressure, to further improve the testing precision of movement speed.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
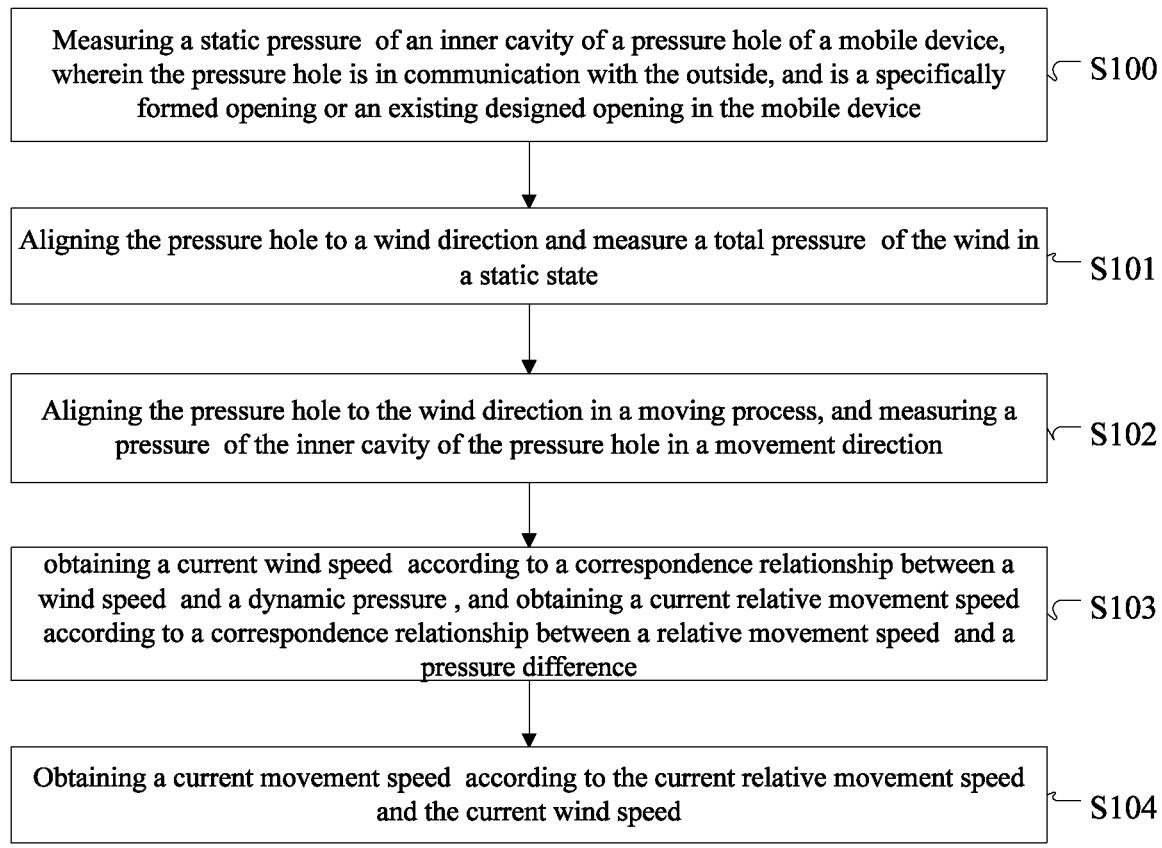
FIG. 1 is a flow chart of a method for testing movement speed according to an embodiment of the present disclosure.

FIG. 1 is a flow chart of a method for testing movement speed according to an embodiment of the present disclosure. The method comprises:

S100: measuring a static pressure $P_0$ of an inner cavity of a pressure hole of a mobile device; wherein the pressure hole communicates with the outside, and is specifically disposed on the mobile device or is an already-existing designed opening;

The mobile device may be a mobile phone, a wearable device or the like.

Since a too large cross-sectional area of the inner cavity of the pressure hole affects wind resistance and further affects the precision of the speed testing, the inner diameter of the inner cavity of the pressure hole is generally set to be about 3.5 mm in practical application, but it is not limited to this. The cross-sectional area of its inner cavity may be specifically set according to the design structure and the application needs of the mobile device.

It needs to be appreciated that the pressure hole may be specifically arranged to match with the design structure of the mobile device, and other openings of the mobile device, e.g., an earphone jack, a power supply hole or other openings connected to the outside, may be used as the pressure hole of the present embodiment to make the appearance of the mobile device simple and beautiful.

S101: aligning the pressure hole to a wind direction and measuring a total pressure P of the wind in a static state.

S102: aligning the pressure hole to the wind direction in a moving process, and measuring a pressure $P_m$ in of the inner cavity of the pressure hole in a movement direction.

S103: obtaining a current wind speed $v_f$ according to a correspondence relationship between a wind speed $v_f$ and a dynamic pressure $P-P_0$; and obtaining a current relative movement speed $v_r$ according to a correspondence relationship between a relative movement speed $v_r$ and a pressure difference $P_m-P_0$.

Specifically, the current wind speed $v_f$ is obtained according to the formula $$v_f = \sqrt{\frac{2(P-P_0)}{\rho}},$$

and the current relative movement speed $v_r$ is obtained according to the formula $$v_r = \sqrt{\frac{2(P_m-P_0)}{\rho}},$$

wherein $\rho$ is air density.

It needs to be appreciated that the air density $\rho$ in the above technical solution may be the air density constant 1.29 kg/m3 in the standard state, or may be the air density constant 1.205 kg/m3 at the normal temperature and under the normal pressure, or may be the air density obtained by other methods in any environment.

In a preferred implementation, the air density $\rho$ in any environment is obtained by the following steps:

measuring a water vapor pressure e in air and measuring an air temperature T; and calculating the air density $\rho$ according to the formula $$\rho = \frac{P}{R_B T}(1-0.378e/P),$$

wherein $R_B$=287.05 J·kg$^{-1}$·K$^{-1}$ is a gas constant of dry air, and P is the total pressure of the wind.

The present preferred embodiment can precisely measure the air density and thereby improve the testing precision of movement speed by measuring the water vapor pressure and temperature in air in any environment.

S104: obtaining a current movement speed v according to the current relative movement speed $v_r$ and the current wind speed $v_f$.

Specifically, the current movement speed v is calculated according to the formula v=$v_r$+$v_f$·cos θ, wherein θ is an angle of the deviating of the movement direction from the wind direction and in a range of [0°, 360°].

In practical application, a device such as a gyro may be used to measure the angle of the deviating of the movement direction from the wind direction, so that a movement speed in any wind direction state is obtained and the accuracy of the calculation results is ensured.

In a preferred solution of the present embodiment, in upwind movement, the current movement speed v is calculated according to the formula v=$v_r$−$v_f$; and in downwind movement, the current movement speed v is calculated according to the formula v=$v_r$+$v_f$.

The above method of obtaining the movement speed by calculating the wind speed $v_f$ and relative movement speed $v_r$ in the movement direction exhibits a high accuracy, but requires a device such as gyro to measure the angle of the deviating of the movement direction from the wind direction. However, in the preferred solution, the wind speed in the movement direction is simplified as two cases, namely, upwind and downwind, and the movement speed is calculated respectively using corresponding formulas in downwind movement and upwind movement. The method is simple and produces accurate and reliable results. A suitable solution may be selected according to the demands in uses in practical application.

It needs to be appreciated that the method of the present technical solution may obtain the real-time state of the movement procedure, e.g., an acceleration sensor is used to measure the acceleration during movement, and a magnetic sensor and a gyro are used to measure the turning angle in the movement direction.

Figure 2:
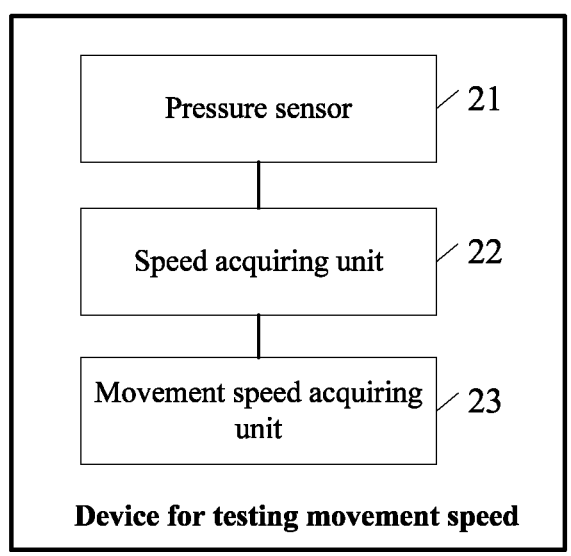
FIG. 2 is a block diagram of a device for testing movement speed according to an embodiment of the present disclosure.

FIG. 2 is a block diagram of a device for testing movement speed according to an embodiment of the present disclosure. The device for testing movement speed comprises:

a pressure sensor 21 disposed in an inner cavity of a pressure hole of the testing device; wherein the pressure hole communicates with the outside, and is specifically disposed on the testing device or is an already-existing designed opening; the pressure sensor 21 is configured to obtain a static pressure $P_0$ of the inner cavity of the pressure hole, and align the pressure hole to a wind direction and measure a total pressure P of the wind in a static state, and measure a pressure $P_m$ of the inner cavity of the pressure hole in the movement direction during movement.

It needs to be appreciated that the device for testing movement speed of the present embodiment may be disposed in a mobile device such as a mobile phone, a wearable device or the like.

The device for testing movement speed comprises: a speed acquiring unit 22 configured to obtain a current wind speed $v_f$ according to a correspondence relationship between a wind speed $v_f$ and a dynamic pressure P−$P_0$, and obtain a current relative movement speed $v_r$ according to a correspondence relationship between a relative movement speed $v_r$ and a pressure difference $P_m$−$P_0$.

Preferably, the speed acquiring unit 22 comprises:

a wind speed acquiring module configured to obtain the current wind speed $v_f$ according to the formula $$v_f = \sqrt{\frac{2(P-P_0)}{\rho}};$$

a relative speed acquiring module configured to obtain the current relative movement speed $v_r$ according to the formula $$v_r = \sqrt{\frac{2(P_m-P_0)}{\rho}},$$

wherein $\rho$ is air density; and a movement speed acquiring unit 23 configured to obtain a current movement speed v according to the current relative movement speed $v_r$ and the current wind speed $v_f$.

Specifically, the movement speed acquiring unit 23 is further configured to:

calculate the current movement speed v according to the formula v=$v_r$+$v_f$·cos θ, wherein θ is an angle of the deviating of the movement direction from the wind direction and in a range of [0°, 360°]. In practical application, a device such as a gyro may be used to measure the angle of the deviating of the movement direction from the wind direction, so that a movement speed in any wind direction state is obtained and the accuracy of the calculation results is ensured.

In addition, the movement speed acquiring unit 23 may further be configured to, in upwind movement, calculate the current movement speed v according to the formula v=$v_r$−$v_f$; and in downwind movement, calculate the current movement speed v according to the formula v=$v_r$+$v_f$.

In a preferred embodiment, device for testing movement speed further comprises:

a humidity sensor configured to measure a water vapor pressure e in air;

a temperature sensor configured to measure an air temperature T; and an air density acquiring unit configured to calculate the air density ρ according to the formula $$\rho = \frac{P}{R_B T}(1 - 0.378e/P),$$

wherein $R_B$=287.05 J·kg$^{-1}$·K$^{-1}$ is a gas constant of dry air.

Preferably, the temperature sensor and the humidity sensor of the present embodiment are both disposed in the inner cavity of the pressure hole of the device for testing movement speed to improve the accuracy of the obtained air density. Further, preferably, the temperature sensor and the pressure sensor of the present embodiment are integrated on the same chip, or the temperature sensor, the humidity sensor and the pressure sensor may be integrated on the same chip, to save physical space and improve the integration degree of the device.

It needs to be appreciated that in practical application, the device for testing movement speed may further comprise an acceleration sensor, a magnetic sensor and a gyro, to thereby obtain the real-time movement states during movement such as the acceleration, the movement direction and the turning angle in the movement direction.

To conclude, the embodiments of the present disclosure provide a method and device for testing movement speed, wherein the pressure sensor is used to measure the static pressure of the inner cavity of the pressure hole of the testing device and the total pressure in the static state, and the pressure in the inner cavity during movement; the wind speed and the relative movement speed are obtained individually according to the correspondence relationship of the speed and the pressure difference; and the movement speed is obtained by selecting corresponding relation formulas according to upwind and downwind situations.

The present technical solution can effectively improve the testing precision of movement speed, there are no influence from external factors during testing, the testing results is accurate and reliable, and the technical solution is completely different from the solution of using the GPS to test movement speed in the prior art. In the preferred embodiment, the temperature sensor and the humidity sensor are respectively used to measure the air temperature and humidity, and the air density in any environment is calculated according to the air temperature and the humidity to replace the air density constant at the normal temperature and under the normal pressure, to further improve the testing precision of movement speed.

Figure 3:
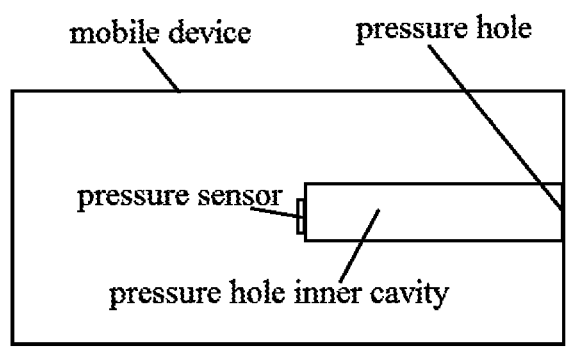
FIG. 3 is a schematic view illustrating a non-limiting embodiment of a mobile device.

FIG. 3 is a schematic view illustrating a non-limiting embodiment of a mobile device depicting the technical features "inner cavity of a pressure hole of a mobile device" and "pressure sensor disposed in an inner cavity of a pressure hole of the testing device".

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for testing movement speed, wherein the method comprises:

measuring a static pressure $P_0$ of an inner cavity of a pressure hole of a mobile device, wherein the pressure hole is in communication with an outside, and is a specifically formed opening or an existing designed opening in the mobile device;

aligning the pressure hole to a wind direction and measuring a total pressure P of the wind in a static state;

aligning the pressure hole to the wind direction in a moving process, and measuring a pressure $P_m$ of the inner cavity of the pressure hole in the movement direction;

obtaining a current wind speed $v_f$ according to a correspondence relationship between a wind speed $v_f$ and a dynamic pressure $P-P_0$, and obtaining a current relative movement speed $v_r$ according to a correspondence relationship between a relative movement speed $v_r$ and a pressure difference $P_m-P_0$; and obtaining a current movement speed v according to the current relative movement speed $v_r$ and the current wind speed $v_f$.

2. The method for testing movement speed according to claim 1, wherein the obtaining a current wind speed $v_f$ according to a correspondence relationship between a wind speed $v_f$ and a dynamic pressure $P-P_0$, and the obtaining a current relative movement speed $v_r$ according to a correspondence relationship between a relative movement speed $v_r$ and a pressure difference $P_m-P_0$ comprise:

obtaining the current wind speed $v_f$ according to the formula $$v_f = \sqrt{\frac{2(P-P_0)}{\rho}};$$

and obtaining the current relative movement speed $v_r$ according to the formula $$v_r = \sqrt{\frac{2(P_m-P_0)}{\rho}};$$

wherein ρ is air density.

3. The method for testing movement speed according to claim 2, wherein the method further comprises:

measuring a water vapor pressure e in air and measuring an air temperature T; and calculating the air density ρ according to the formula $$\rho = \frac{P}{R_B T}(1 - 0.378e/P),$$

wherein $R_B$=287.05 J·kg$^{-1}$·K$^{-1}$ is a gas constant of dry air.

4. The method for testing movement speed according to claim 1, wherein the obtaining a current movement speed v according to the current relative movement speed $v_r$ and the current wind speed $v_f$ comprises:

calculating the current movement speed v according to the formula $v=v_r+v_f\cos\theta$, wherein $\theta$ is an angle of the deviating of the movement direction from the wind direction and in a range of [0°,360°].

5. The method for testing movement speed according to claim 1, wherein the obtaining a current movement speed v according to the current relative movement speed $v_r$ and the current wind speed $v_f$ comprises:

in upwind movement, calculating the current movement speed v according to the formula $v=v_r-v_f$; and in downwind movement, calculating the current movement speed v according to the formula $v=v_r+v_f$.

6. A device for testing movement speed, wherein the device comprising:

a pressure sensor, disposed in an inner cavity of a pressure hole of the testing device, wherein the pressure hole is in communication with an outside, and is a specifically formed opening or an existing designed opening in the mobile device; the pressure sensor is configured to obtain a static pressure $P_0$ of the inner cavity of the pressure hole, and align the pressure hole to a wind direction and measure a total pressure P of the wind in a static state, and measure a pressure $P_m$ of the inner cavity of the pressure hole in a movement direction during movement;

a speed acquiring unit configured to obtain a current wind speed $v_f$ according to a correspondence relationship between a wind speed $v_f$ and a dynamic pressure $P-P_0$, and obtain a current relative movement speed $v_r$ according to a correspondence relationship between a relative movement speed $v_r$ and a pressure difference $P_m-P_0$; and a movement speed acquiring unit configured to obtain a current movement speed v according to the current relative movement speed $v_r$ and the current wind speed $v_f$.

7. The device for testing movement speed according to claim 6, wherein the speed acquiring unit comprises:

a wind speed acquiring module configured to obtain the current wind speed $v_f$ according to the formula $$v_f = \sqrt{\frac{2(P-P_0)}{\rho}};$$

and a relative speed acquiring module configured to obtain the current relative movement speed $v_r$ according to the formula $$v_r = \sqrt{\frac{2(P_m-P_0)}{\rho}};$$

wherein $\rho$ is air density.

8. The device for testing movement speed according to claim 7, wherein the device for testing movement speed further comprises:

a humidity sensor configured to measure a water vapor pressure e in air;

a temperature sensor configured to measure an air temperature T; and an air density acquiring unit configured to calculate the air density $\rho$ according to the formula $$\rho = \frac{P}{R_B T}(1-0.378e/P),$$

wherein $R_B$=287.05 J·kg$^{-1}$·K$^{-1}$ is a gas constant of dry air.

9. The device for testing movement speed according to claim 6, wherein the movement speed acquiring unit is specifically configured to calculate the current movement speed V according to the formula $v=v_r+v_f\cos\theta$, wherein $\theta$ is an angle of the deviating of the movement direction from the wind direction and in a range of [0°,360°].

10. The device for testing movement speed according to claim 6, wherein the movement speed acquiring unit is specifically configured to, in upwind movement, calculate the current movement speed v according to the formula $v=v_r-v_f$; and in downwind movement, calculate the current movement speed v according to the formula $v=v_r+v_f$.

* * * * *